US010856955B2

(12) United States Patent
Warshawsky et al.

(10) Patent No.: US 10,856,955 B2
(45) Date of Patent: Dec. 8, 2020

(54) ORTHODONTIC APPLIANCE FOR MANDIBULAR ADVANCEMENT

(71) Applicant: Genius Platforms, LLC, Glenview, IL (US)

(72) Inventors: Neil Warshawsky, Glenview, IL (US); Adam Schulhof, New Milford, NJ (US); Sung Kim, San Francisco, CA (US)

(73) Assignee: Genius Platforms, LLC, Glenview, IL (US)

( * ) Notice: Subject to any disclaimer, the term of this patent is extended or adjusted under 35 U.S.C. 154(b) by 25 days.

(21) Appl. No.: 15/467,822

(22) Filed: Mar. 23, 2017

(65) Prior Publication Data

US 2018/0147028 A1 May 31, 2018

Related U.S. Application Data

(60) Provisional application No. 62/426,894, filed on Nov. 28, 2016.

(51) Int. Cl.
*A61C 7/36* (2006.01)
*A61C 7/08* (2006.01)

(52) U.S. Cl.
CPC ............... *A61C 7/36* (2013.01); *A61C 7/08* (2013.01)

(58) Field of Classification Search
CPC .......... A61C 7/36; A61C 7/08; A61C 11/025; A61C 11/085
See application file for complete search history.

(56) References Cited

U.S. PATENT DOCUMENTS

| 6,932,598 | B1 * | 8/2005 | Anderson | A61C 7/36 |
| | | | | 433/18 |
| 6,976,839 | B2 | 12/2005 | Lluch | |
| 7,238,022 | B2 | 7/2007 | Lluch | |
| 7,618,257 | B2 | 11/2009 | Lluch | |
| 7,637,262 | B2 | 12/2009 | Bailey | |
| 7,985,070 | B2 | 7/2011 | Carriere Lluch | |
| 9,655,692 | B2 * | 5/2017 | Lucas | A61C 7/08 |
| 9,844,424 | B2 * | 12/2017 | Wu | A61C 7/002 |
| 2014/0076332 | A1 | 3/2014 | Luco | |
| 2015/0238280 | A1 * | 8/2015 | Wu | A61C 7/002 |
| | | | | 433/6 |
| 2016/0106521 | A1 | 4/2016 | Tanugula et al. | |
| 2016/0199215 | A1 | 7/2016 | Kopelman | |
| 2016/0199216 | A1 * | 7/2016 | Cam | A61F 5/566 |
| | | | | 128/848 |
| 2016/0228286 | A1 * | 8/2016 | Rayek | A61F 5/566 |
| 2016/0361139 | A1 | 12/2016 | Webber et al. | |

(Continued)

*Primary Examiner* — Yogesh P Patel
*Assistant Examiner* — Stephen R Sparks
(74) *Attorney, Agent, or Firm* — Dorr, Carson & Birney, PC

(57) ABSTRACT

An orthodontic appliance has a ramp extending laterally from the posterior teeth on one of the patient's mandibular/maxillary dental arches. The ramp is curved with a J-shaped occlusal ramp surface extending diagonally upward toward its anterior aspect. The ramp also includes a stop at the gingival end of the ramp surface. A post extends laterally from the posterior teeth on the other dental arch. The post contacts and slides along the ramp surface toward the stop to guide the mandible forward as the mandible closes. The post seats against the stop to define a limit for closure of the mandible.

10 Claims, 7 Drawing Sheets

(56) References Cited

U.S. PATENT DOCUMENTS

| | | | |
|---|---|---|---|
| 2017/0000643 A1* | 1/2017 | Gelb | A61F 5/566 |
| 2017/0231723 A1* | 8/2017 | Lucas | A61C 7/08 |
| | | | 433/6 |
| 2017/0273819 A1* | 9/2017 | Shim | A61F 5/566 |

* cited by examiner

ORTHODONTIC APPLIANCE FOR MANDIBULAR ADVANCEMENT

RELATED APPLICATION

The present application is based on and claims priority to the Applicant's U.S. Provisional Patent Application 62/426,894, entitled "Orthodontic Appliance For Mandibular Advancement," filed on Nov. 28, 2016.

BACKGROUND OF THE INVENTION

Field of the Invention

The present invention relates generally to the field of orthodontic appliances, and more particularly to orthodontic appliances for mandibular advancement.

Statement of the Problem

Proper anterior-posterior positioning of the patient's mandible relative to the maxilla has long been a problem in orthodontics, particularly with removable orthodontic appliances. The present invention tackles this problem of correcting such anterior-posterior (or AP) malocclusions.

The field of orthodontics recognizes several types of AP malocclusions. Perhaps the most common type is known as a "class II" malocclusion in which the mandible is posterior to its desired position relative to the maxilla. When the jaw is closed, this results in the patient's upper teeth being anterior to their desired positions relative to the lower teeth. This sometimes referred to an "over bite" condition.

The prior art in the field of orthodontics includes a number of approaches to AP class II orthodontic correction by repositioning the mandible forward with respect to the maxilla. This inherently entails changing the position of the mandible in the temporomandibular joint (or TMJ) that connects the mandible to the base of the skull. It important to note that the temporomandibular joint is not a simple hinge joint. Rather, it is a complex structure that includes a condyle on the mandible that slides along an articular eminence coming down from the fossa on the base of the skull. The slope of this articular eminence can vary from shallow to steep depending on each patient's morphology. In turn, this dictates that the range of motion of the mandible (as the jaw opens and closes) has a significant degree of variability from patient to patient. This must be accommodated in designing appliances for AP orthodontic correction.

As previously noted, there have been many prior-art approaches to AP class II orthodontic correction. However, these prior-art approaches have drawbacks, especially when used in conjunction with aligner treatment. In particular, a review of systems currently available for class II correction with aligners reveals only two approaches are currently meeting with success. That is not to say that there may not be other ways to achieve AP correction with aligners, but these two ways seem to be the most accepted when speaking among peers.

The first prior-art approach is the Carriere Motion appliance marketed by Henry Schein. The Carriere appliance is generally disclosed in U.S. Pat. No. 6,976,839 (Lluch), U.S. Pat. No. 7,618,257 (Lluch), U.S. Pat. No. 7,238,022 (Lluch) and U.S. Pat. No. 7,985,070 (Carriere Lluch). The Carriere approach attaches a maxillary bar between the mesial aspect of the patient's first permanent molar and the permanent canine or first premolar. The mandibular teeth in the Carriere system are fitted with a lower holding arch and a first molar band with a hook. The bar has an articulated point on the mesial aspect of the first molar cusp tip. Class II elastics are worn from the anterior end of the bar down to the hook on the mesial aspect of the mandibular first molar band. This is a Class II elastic and it generally relies on the rotation of the upper first molar to gain at least 50% of the required AP correction.

When the Carriere appliance is successful a space will occur between the lateral and canine teeth indicating that the AP correction has occurred. However, the space created by this AP correction creates more work to be done than how the case originally presented. Generally speaking, if the goal was to correct the case with an aligner system, now everything must be removed, provisional retainers must be built to hold the corrections that have been achieved, and then a scan must be acquired to build the actual aligner system to correct the malocclusion. The aligner system generally requires three to four weeks to be built, and will most likely require attachments to drive the alignment of the teeth to completion. Estimated treatment time for a class II correction will be four to six months for the AP correction alone, a month of build time for the fabrication of the aligners, and then an average of fifteen to eighteen months of active alignment time. In total, the time can easily exceed two years and is likely to not completely correct the AP positioning.

The second mode of AP correction is simply class II elastics. In the case of the Invisalign system, the upper aligners typically will have a slot prefabricated into the upper canines. The lower molars have an inverted U-shaped cutout so that a fixed metal orthodontic attachment can be bonded to the lower molars on the buccal wall. Elastics are placed by the patient from the upper aligner to the lower molar bonded attachments. It is possible to place a slit in the lower aligner at the level of the first molar, but the bonded molar attachment may be a more reasonable solution. In this scenario, when the canine slot is added to the aligner, it becomes mandatory in the Invisalign software to remove the attachment from the canine. Removing this will cause the aligner to be ineffective at reducing the rotational momentum that is applied to the tooth underneath the aligner. In effect, if aligners are worn for a while with elastics, they tend to cause the canines to rotate with time, and this causes more work for the doctor in the end. Often times, a reboot will be required to finish the alignment, again causing more work for the doctor. This is also all dependent on patient compliance. Often times, a patient will wear their aligners but not their elastics.

Solution to the Problem

The present invention addresses these shortcomings by providing an orthodontic application that effectively enables AP class II correction, while simultaneously providing aligner-based correction of malocclusion.

SUMMARY OF THE INVENTION

This invention provides an orthodontic appliance having a ramp extending laterally from the posterior teeth on one of the patient's mandibular/maxillary dental arches. The ramp is curved with a J-shaped occlusal ramp surface extending diagonally upward toward its anterior aspect. The ramp also includes a stop at the gingival end of the ramp surface. A post extends laterally from the posterior teeth on the other dental arch. The post contacts and slides along the ramp surface toward the stop to guide the mandible forward as the mandible closes. The post seats against the stop to define a limit for closure of the mandible.

For example, the ramp can be attached to and supported by a removable polymeric aligner or an orthodontic band bonded to at least one of the posterior teeth. The slope, dimensions and placement of the ramp surface can be selected to be gnathologically correct and to allow proper functioning of the TMJ. Preferably, the ramp surface continues into a curved portion adjacent to its gingival end to define the stop, and thereby gives the ramp a generally J-shaped configuration.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
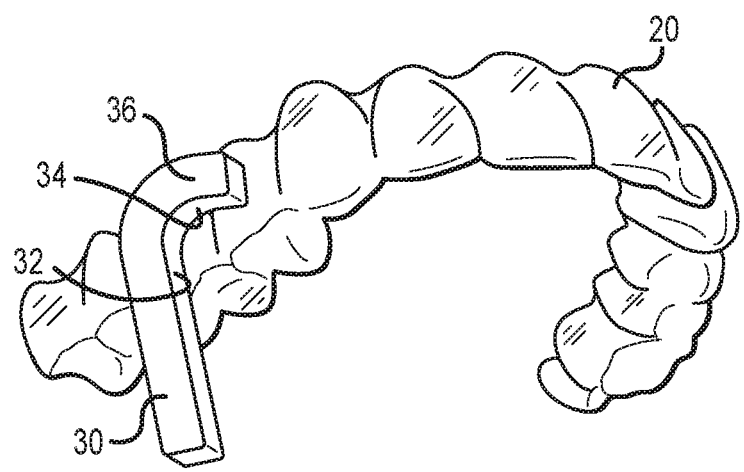
FIG. 1 is a top axonometric view of an embodiment of the maxillary appliance 20 in the present invention.
Figure 2:
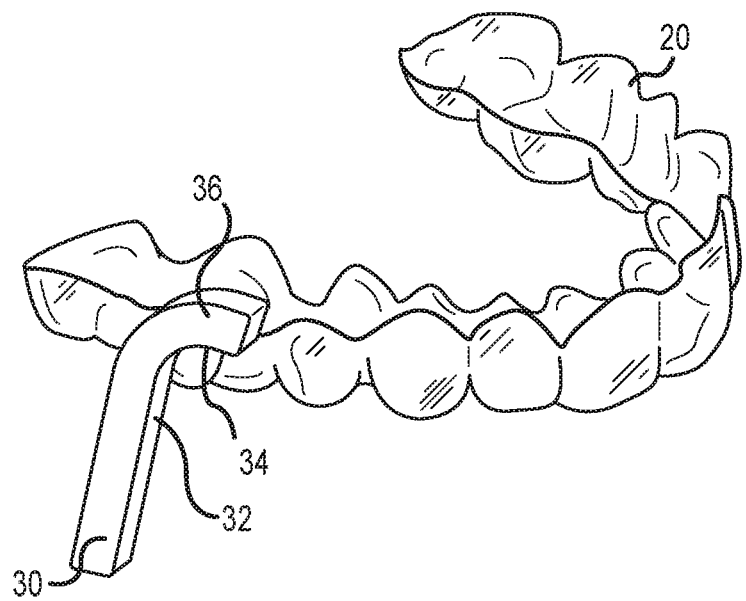
FIG. 2 is a bottom axonometric view of the maxillary appliance 20 corresponding to FIG. 1.
Figure 3:
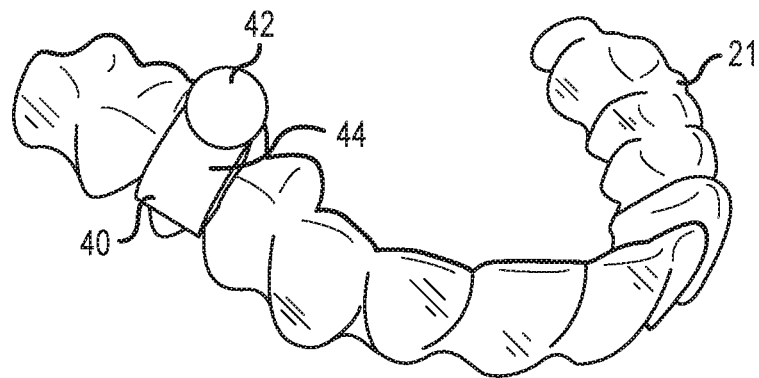
FIG. 3 is a top axonometric view of an embodiment of the mandibular appliance 21 in the present invention.
Figure 4:
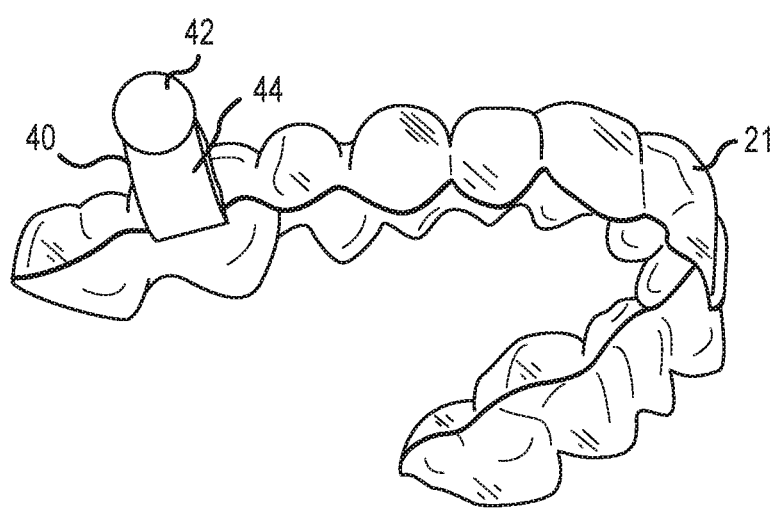
FIG. 4 is a bottom axonometric view of the mandibular appliance 21 corresponding to FIG. 3.

The present invention generally includes a maxillary (or upper) appliance 20 to engage at least some of the patient's maxillary teeth 11, and a mandibular (or lower) appliance 21 to engage at least some of the mandibular teeth 13. Turning to FIGS. 1 and 2, top and bottom views are shown of an embodiment of the maxillary appliance 20. Corresponding top and bottom views of the mandibular (lower) appliance 21 are depicted in FIGS. 3 and 4. For example, both appliances 20, 21 can be fabricated as a thin polymeric shell having recesses to receive and removably engage the patient's maxillary or mandibular teeth 11, 13. This type of appliance is commonly known in the orthodontic field as an "aligner." Optionally, the appliances 20, 21 can also be equipped with clasps (e.g., ball clasps) to assist in engaging the teeth. The appliances shown in FIGS. 1-4 are designed to removably engage all of the maxillary or mandibular teeth 11, 13, although appliances could be designed to engage only a selected subset of the maxillary or mandibular teeth 11, 13.

The polymeric shell portions of the appliances can be made by thermoforming a thin, heated sheet of polymeric material over a form or model using suction. This is sometimes referred to as a "suck-down" process. Alternatively the polymeric shell of the appliance could be made by CNC machining or milling, or by molding or 3D printing.

Figure 5:
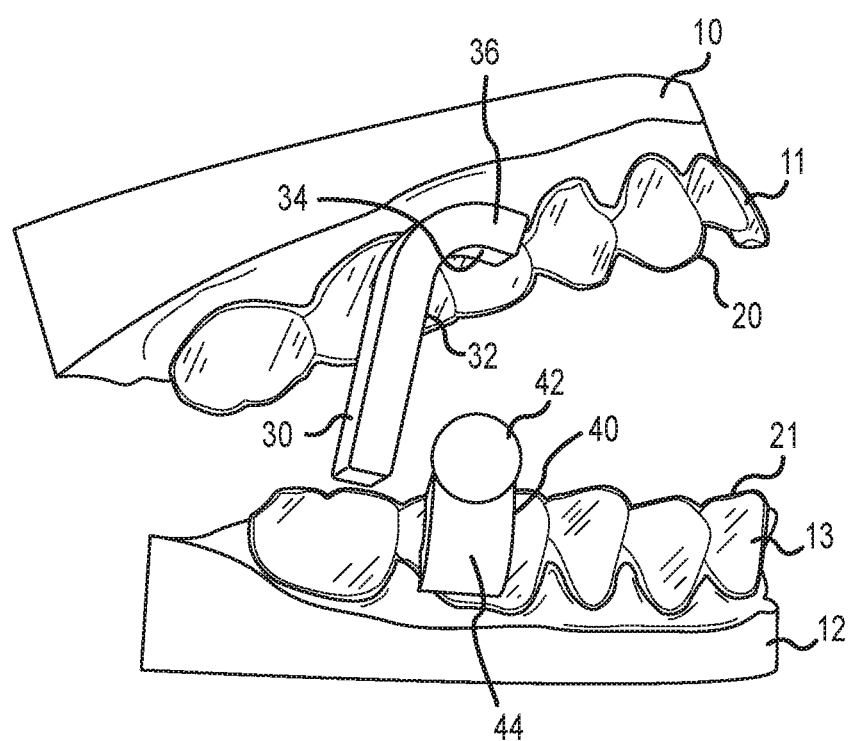
FIG. 5 is a side view of both appliances 20, 21 on a patient's teeth with the jaw 12 open.
Figure 6:
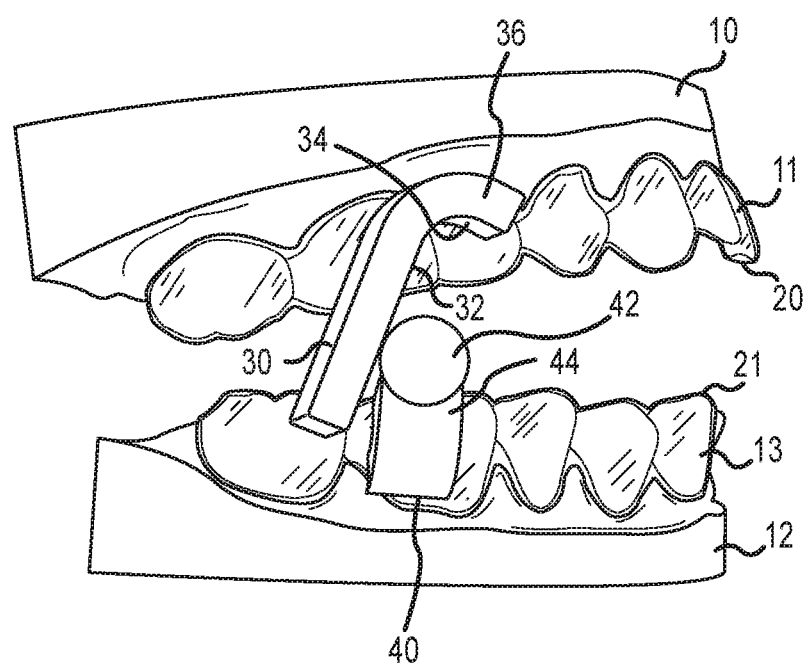
FIG. 6 is a side view corresponding to FIG. 5 with the mandible 12 partially closed so that the post 40 on the mandibular appliance 21 is guided along the ramp surface 32 of the ramp 30 on the maxillary appliance 20.
Figure 7:
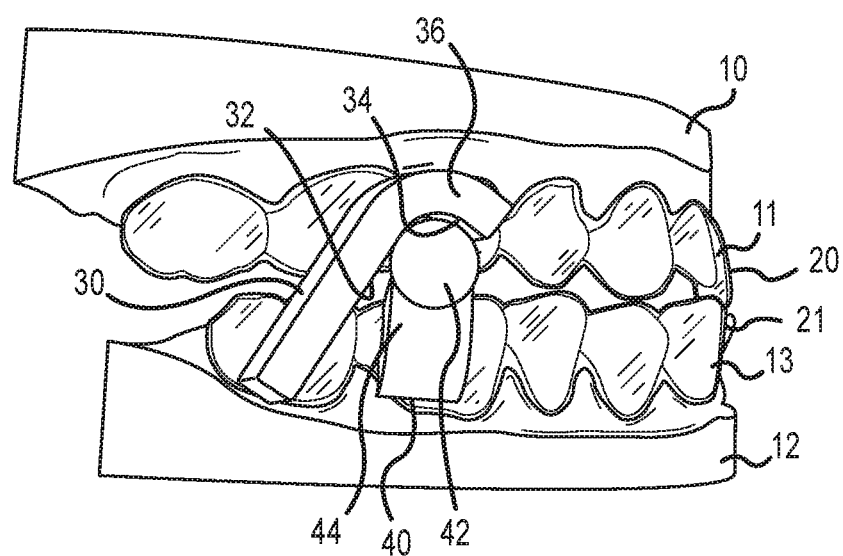
FIG. 7 is a side view corresponding to FIGS. 5 and 6 with the mandible 12 closed to move the post 40 along the ramp surface 32 to the stop 34 at the anterior end of the ramp 30.

In the embodiment illustrated in FIGS. 1-4, a ramp 30 extends laterally outward from the buccal aspect of the maxillary appliance 20 adjacent to the posterior maxillary teeth 11, as shown in FIGS. 5-7. This ramp 30 has an occlusal ramp surface 32 extending diagonally upward from its posterior end to its anterior end in a substantially vertical plane. In particular, the ramp surface 32 runs diagonally from the posterior-occlusal aspect to the anterior-gingival aspect of the ramp 30. There is also a stop 34 at the anterior-gingival end of the ramp surface 32, as will be described in greater detail below.

A post or rounded protrusion 40 extends laterally outward from the buccal aspect of the mandibular appliance 21 adjacent to the lower posterior teeth 13 below the ramp 30. As shown in FIGS. 3 and 4, this post 40 can have a rounded head 42 supported by an arm 44 connected to the mandibular appliance 21 adjacent to the lower molars 13. The arm 44 provides predetermined horizontal and vertical offsets for the post 40 relative to the mandibular appliance 21 and the mandible 12, so that the post 40 and ramp surface 32 share the same vertical plane offset laterally from the buccal aspects of their respective appliances 20, 21. The post 40 is designed to come into contact with the ramp surface 32, and then slide anteriorly along the ramp surface 32 as the mandible 12 closes against the maxilla 10. The upward slope or incline of the ramp surface 32 allows the jaw 12 to close, but also gradually moves the mandible 12 forward to a desired position relative to the maxilla 12 as it closes, thereby providing anterior-posterior (or AP) correction for the mandible 12. The post 40 seats against the stop 34 to set limits for closure and advancement of the mandible 12. Preferably, the ramp surface 32 continues smoothly into a curved end portion 36 to define the stop 34, with a generally J-shaped overall configuration for the ramp 30.

FIG. 5 is a side view of both appliances 20, 21 on a patient's teeth with the jaw 12 open, so that the post 40 does not contact the ramp surface 32. FIG. 6 is a corresponding side view with the mandible 12 partially closed so that the post 40 is guided along the ramp surface 32 of the ramp 30. FIG. 7 is a corresponding side view with the mandible 12 fully closed against the maxilla 10. Here, the post 40 has moved along the ramp surface 32 to rest in the stop 34 at the anterior end of the ramp 30.

Figure 8:
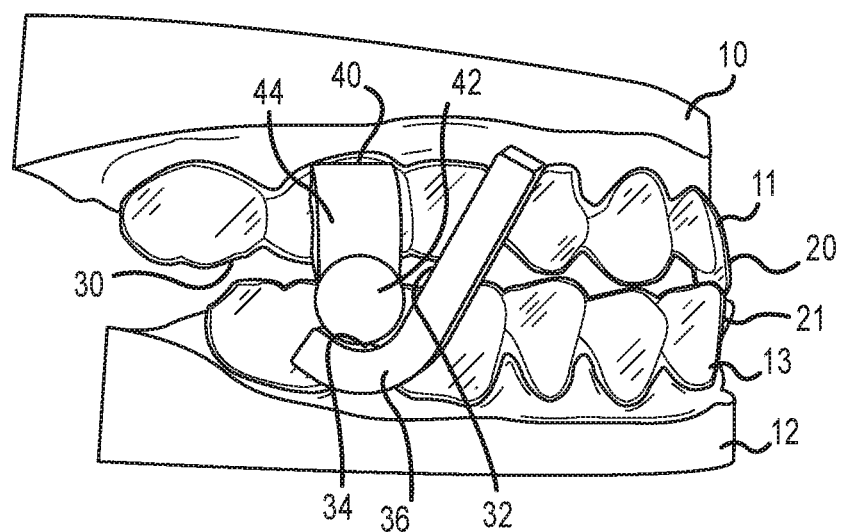
FIG. 8 is a side view of another embodiment of the present invention in which the post 40 is on the maxillary appliance 20 and the ramp 30 is on the mandibular appliance 21.

In the embodiment of the present invention shown in the accompanying drawings, the ramps 30 and posts 40 extend from the buccal aspects of the maxillary and mandibular appliances 20, 21. Alternatively, the ramps 30 and posts 40 could extend from the lingual aspects of the appliances 20, 21. Also, It should be noted the positions of the post 40 and ramp 30 can be reversed on the mandibular and maxillary appliances 21, 20 without changing their functionality. FIG. 8 is a side view of an embodiment of the present invention in which the post 40 is on the maxillary appliance 20 and the ramp 30 is on the mandibular appliance 21.

Preferably, the present invention can be manufactured by 3D printing. Alternatively, the ramp 30 and post 40 can be produced by 3D printing, while the maxillary and mandibular appliances 20, 21 can be produced by other conventional means, such as thermoforming, molding, milling or machining. The ramps 30 and posts 40 can then be secured to the maxillary and mandibular appliances 20, 21 by adhesive or fasteners. For convenience, these ramps 30 and posts 40 can be referred to as the "AP components" of the present invention, in contrast to the aligner-like appliances 20, 21.

For example, we can create a time-series of models for creating the appliances 20, 21 via conventional suck-down technology, similar to the process used in Invisalign orthodontic treatment to create a progressive time-series of aligners. With this time-series of appliances, the AP components 30, 40 can be reused and attached at every stage of treatment. Given that each aligner is required for approximately four weeks, this is enough time for the AP effect to be active and affect the TMJ, and over the course of treatment, AP correction is witnessed.

Alternatively, the AP components 30, 40 can be removable from the appliances 20, 21. For example, the AP components can be removably attached to the appliance 20, 10 by tabs/slots, pins, snaps or adhesive bonding. This allows different AP components 30, 40 to be employed with one or more sets of appliances 20, 21 over the course of treatment as the jaw is repositioned.

As previously noted, the TMJ is a complex joint and the interaction between the post 40 and ramp surface 32 must be based on human physiology to provide proper class II correction for each patient. The present invention is based on the thesis that if you build an aligner system where the posterior teeth are potentially fixed for a period of time, you can add AP correction into it. Here, the upper and lower appliances 20, 21 are effectively aligners fitted with buccally-placed AP components 30, 40 that position the mandible forward. Since the AP components 30, 40 are mounted posteriorly, they allow the anterior teeth to still manage minor tooth movement while the AP components 30, 40 of the device position the condyle of the mandible 12 down the articular eminence, causing compensatory growth of the condyle, similar to what we see in Herbst Mara and other orthopedic appliances. Since this custom AP correction based on the anatomy of the articular eminence and the fossa is chosen by the doctor, the shape, pitch and length of the ramp surface 32 and amount of AP correction can be dictated by the doctor to best fit the patient's needs.

The AP components 30, 40 can be printed into the appliances 20, 21 or reused between sets of appliances at each stage of treatment, so the doctor will have the opportunity after several months to adjust the AP positioning of the upper and lower members. In particular, the posts 40 are readily customizable to the patient's individual anatomy. This allows for further anterior activation of the appliances which allows for further AP correction of the mandible. Because stages are printed and replaced every few weeks, the ability to change the degree of the correction is quite simple. It does not require unsightly metal shims such as those used by Forsus, Powerscope 2, Twin Force, Esprit, and Herbst appliances. The doctor will have the choice to include or exclude the AP components on each set of aligners. From a staging perspective that means that the doctor may initiate the AP correction any time the molar teeth stop moving. It is likely that after a certain period of time passes, and the molars are leveled and aligned, it is expected that the posterior teeth would be stable and the AP correction may begin.

Properly positioned, the AP components 30, 40 are not visible because they are distal to the oral commissure. More appealing than its esthetics, it is more comfortable compared to the traditional fixed AP appliances that were mentioned above. These components also has a smaller profile compared to the traditional bulky spring-based or piston-based appliances.

Figure 9:
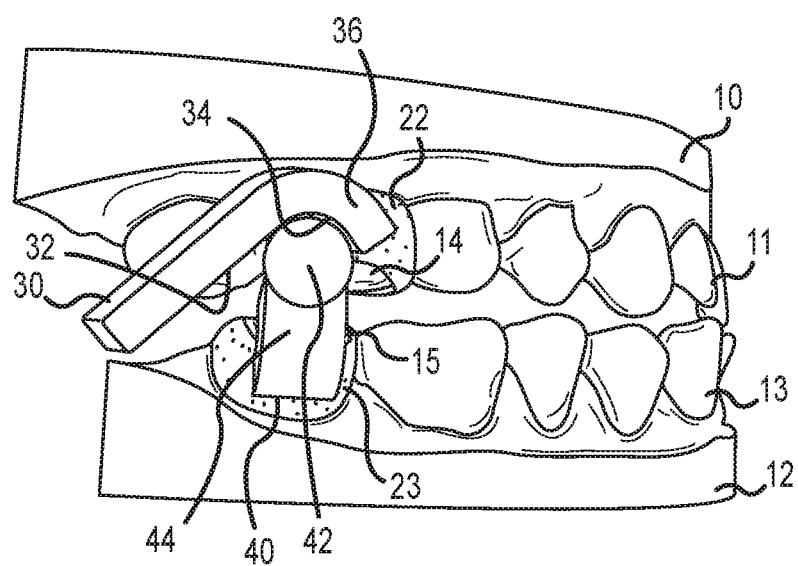
FIG. 9 is a side view of another embodiment of the present invention in which the ramp 30 and post 40 extend from orthodontic bands 22, 23 attached to upper and lower molars 14, 15.

The embodiments of the present invention discussed above use removable appliances 20, 21 to support the ramp 30 and post 40. For example, these appliances 20, 21 can be thin-shelled polymeric aligners with cavities that removably receive and engage selected teeth, as previously discussed. It should be understood that other means could be employed for this purpose. FIG. 9 is a side view of another embodiment of the present invention in which the ramp 30 and post 40 extend from orthodontic bands 22, 23 bonded to upper and lower posterior teeth 14, 15 (e.g., first or second molars).

Unlike the earlier embodiments where the AP components 30, 40 are supported by aligner-like removable appliances 20, 21, the embodiment shown in FIG. 9 completely separates AP correction from the aligner functionality. This embodiment employs the same physical mechanism to reposition the jaw. The design process for the pitch of the ramp surface 32 and the shape of the post 40 is the same process as before. However, the AP components 30, 40 are not part of an aligner, but rather are mounted on saddle bands 22, 23. These are custom-made and intended to be cemented on the first molars of a growing individual, for example. The lingual or palatal side of the band can contain a sheath to allow the doctor to add the preferred anchorage of their option. Upper options may include rapid palatal expander, trans-palatal bar, Ni—Ti expander, habit appliance, Nance button or other options at the discretion of the doctor. The lower arch could include a holding arch, but again, the lingual sheath will allow it to be removable as the doctor sees fit.

This embodiment offers a number of advantages. Cases can start AP correction ahead of the alignment stages of treatment if the teeth are delayed in erupting. Often times, the teeth are still erupting in a teen so it is ok to do a midcourse scan to capture better anatomy in the aligners. AP correction to that point will not be compromised. There are no moving/springing parts to break or complications from having many movable parts. This embodiment can be designed to be used with a wide range of conventional appliances, including braces and other removable appliances. In the event that a patients grows, or the appliance is under-activated due to an incorrect bite at the diagnostic records visit, a sheath (not shown) can be attached over the ramp 30 to effectively shift the ramp surface 32 and thereby advance the mandible 12.

Finally, the embodiment shown in FIG. 9 can be used to help correct the vertical, as well as AP position of the mandible 12. A pad can be placed on the occlusal aspect of the saddle band 22, 23 to provide vertical positioning. Additionally, the vertical position of the stop 34 on the ramp 30 can be selected to accomplish this purpose.

In general terms, these alternative embodiments can be summarized by saying that the ramp 30 extends laterally from a fixed or removable appliance supported by at least one posterior tooth on either the mandibular or maxillary dental arches, and the post 40 extends laterally from an appliance supported by at least one posterior tooth on the other of the patient's dental arches.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. An orthodontic appliance for mandibular advancement in a patient having maxillary and mandibular dental arches of teeth separated by an occlusal plane and having a buccal aspect and a lingual aspect, said appliance comprising:
   a ramp configured to extend laterally from at least one posterior tooth on a first dental arch adjacent to a lateral aspect of said at least one posterior tooth, said ramp having a J-shaped occlusal ramp surface extending diagonally from an occlusal aspect to a gingival aspect with a curved end at the gingival aspect to the ramp surface, said curved end of said J-shaped occlusal ramp surface having a uniformly rounded, arcuate portion curving toward the occlusal plane to form a stop at the gingival aspect of the ramp surface; and
   a post with a proximal end, a distal end, and a uniformly rounded, arcuate portion matching the uniformly rounded, arcuate portion of the curved end of said ramp surface configured to extend laterally from a lateral aspect of at least one posterior tooth on a second dental arch, said rounded, arcuate portion of said post engaging and sliding anteriorly along the diagonally-extending occlusal aspect of said ramp surface toward the curved end thereof forming said stop to guide the mandible forward as the mandible closes, said rounded, arcuate portion of said post thereafter seating and mating against the curved end of said ramp surface forming said stop and thereby defining limits for closure of the mandible in the vertical direction and limits for the position the mandible in the anterior and posterior directions to provide advancement of the mandible.

2. The orthodontic appliance of claim 1 wherein the ramp and post are configured to extend from the buccal aspect of the teeth.

3. The orthodontic appliance of claim 1 wherein the ramp is configured to extend from the maxillary dental arch, and the post is configured to extend from the mandibular dental arch.

4. The orthodontic appliance of claim 1 wherein the ramp is configured to extend from the mandibular dental arch, and the post is configured to extend from the maxillary dental arch.

5. The orthodontic appliance of claim 1 further comprising a removable thin-shelled aligner with cavities for engaging selected teeth, and wherein the ramp extends from the aligner.

6. The orthodontic appliance of claim 1 further comprising a removable thin-shelled aligner with cavities for engaging selected teeth, and wherein the post extends from the aligner.

7. An orthodontic appliance for mandibular advancement in a patient having maxillary and mandibular dental arches of teeth separated by an occlusal plane and having a buccal aspect and a lingual aspect, said appliance comprising:
   a removable thin-shelled aligner with cavities for engaging selected posterior teeth in a first dental arch and having a lateral aspect;
   a ramp extending laterally from the aligner adjacent to the lateral aspect of the aligner, said ramp having a J-shaped occlusal ramp surface extending diagonally from an occlusal aspect to a gingival aspect with a curved end at the gingival aspect of the ramp surface, said curved end of said J-shaped occlusal ramp surface having a uniformly rounded, arcuate portion curving toward the occlusal plane to form a stop at the gingival aspect of the ramp surface; and
   a post with a proximal end, a distal end, and a uniformly rounded, arcuate portion substantially matching the uniformly rounded, arcuate portion of the curved end of said ramp surface configured to extend laterally from the lateral aspect of at least one posterior tooth on a second dental arch, said rounded, arcuate portion of said post engaging and sliding anteriorly along the diagonally-extending occlusal aspect of said ramp surface toward the curved end thereof forming said stop to guide the mandible forward as the mandible closes, said rounded, arcuate portion of said post thereafter seating and mating against the curved end of said ramp surface forming said stop to thereby defining limits for closure of the mandible in the vertical direction and limits for the position of the mandible in the anterior and posterior directions to provide advancement of the mandible.

8. The orthodontic appliance of claim 7 wherein the ramp is configured to extend from the maxillary dental arch, and the post is configured to extend from the mandibular dental arch.

9. The orthodontic appliance of claim 7 wherein the ramp is configured to extend from the mandibular dental arch, and the post is configured to extend from the maxillary dental arch.

10. The orthodontic appliance of claim 7 further comprising a second removable thin-shelled aligner with cavities for engaging selected teeth in the second dental arch, and wherein the post extends from the second aligner.

* * * * *